Jan. 14, 1930. J. T. NORMAN 1,743,381
WAGON
Filed Dec. 15, 1928
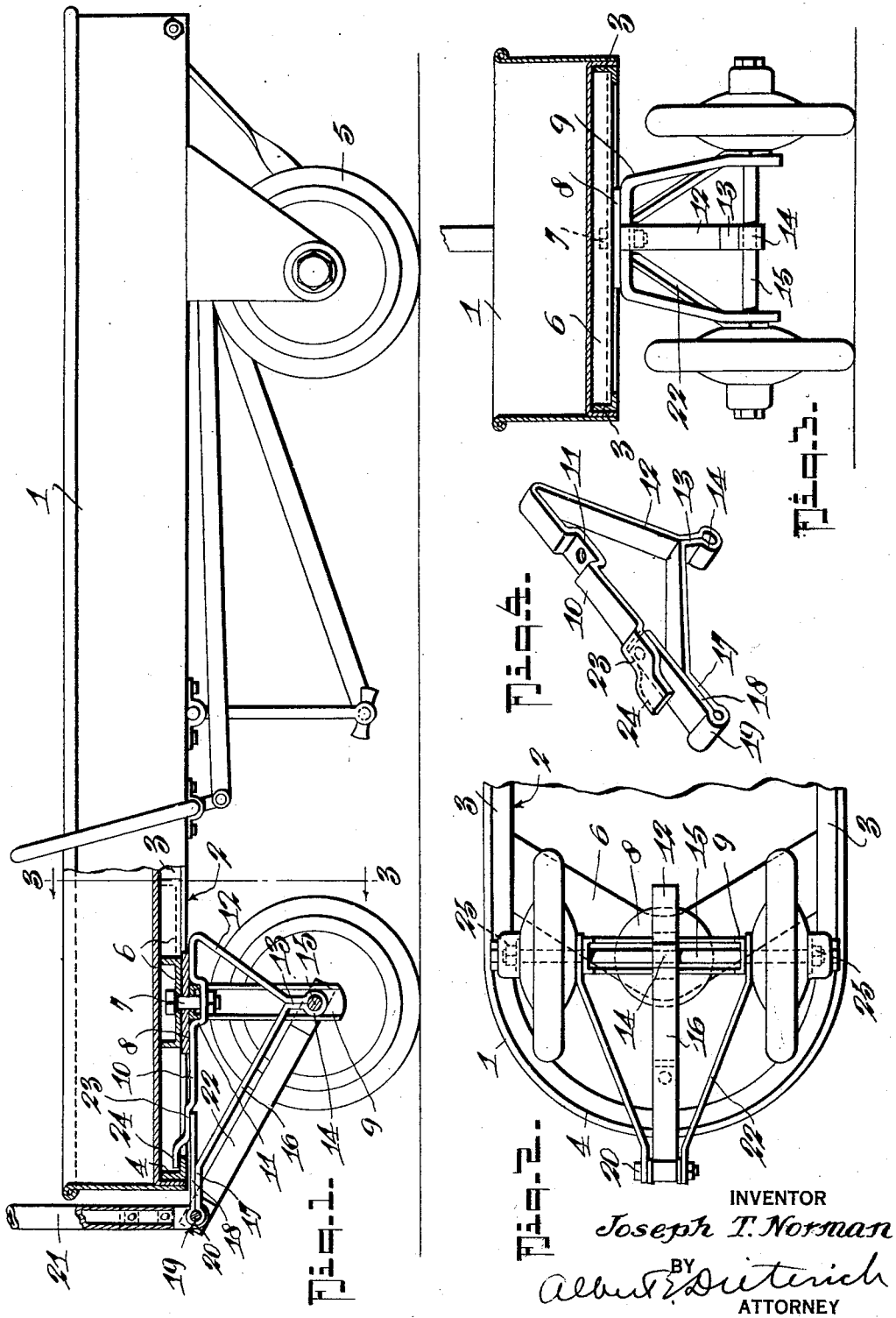
INVENTOR
Joseph T. Norman
BY
Albert E. Dieterich
ATTORNEY Patented Jan. 14, 1930

1,743,381

UNITED STATES PATENT OFFICE

JOSEPH T. NORMAN, OF FREDERICK, MARYLAND, ASSIGNOR TO THE NORMAN MANUFACTURING COMPANY, OF FREDERICK, MARYLAND, A CORPORATION OF MARYLAND

WAGON

Application filed December 15, 1928. Serial No. 326,380.

The invention resides in the provision of certain new and useful improvements in wagon structures, particularly in such structures as are meant for child's use and commonly subjected to more or less rough treatment, means being provided for rendering the structure more durable than others commonly marketed and yet more simple in construction and economical to manufacture and one which may be suitably proportioned for heavier and more practical uses if desired.

Another object of the invention is to provide a novel means for distributing to the wagon frame strains which are commonly distributed to the king bolt and associated parts.

Other objects will in part be obvious and in part be pointed out hereinafter.

To the attainment of the aforesaid objects and ends, the invention further resides in the novel details of construction, combination and arrangement of parts, all of which will be first fully described in the following detailed description, then be particularly pointed out in the appended claims, reference being had to the accompanying drawings, in which:—

Figure 1 is a side elevation of a wagon embodying the invention, the forepart of the structure being shown in longitudinal section.

Figure 2 is an inverted plan view of the forepart of the wagon shown in Figure 1.

Figure 3 is a vertical cross section taken on the line 3—3 on Figure 1.

Figure 4 is a detail perspective view of the draft member per se.

In the drawings in which like numerals of reference indicate like parts in all of the figures, 1 generally designates the body of the wagon which is constructed to include depending flanges which fit over the wagon frame generally designated 2, see Figures 1 and 3.

The wagon frame is preferably constructed of L-shape angle iron, the base of the L being turned inwardly as shown in the figures above referred to and comprise parallel side members 3 joined by a curved front 4 and at the rear by a suitably securing cross brace. The curved front of the wagon frame is curved on the axis of the king bolt as will be clear by reference to Figure 2 of the drawings.

The rear end of the wagon is supported in any suitable manner upon the rear wheels 5. A cross brace or channel member 6 is mounted upon the frame adjacent the front end thereof and has its lateral ends secured to the side members 2. It will be observed by reference to Figure 2 that the member 6 is V-shaped with the point of the V directed forwardly so that shocks directed to the said member will be distributed laterally to the frame. In this manner bending of the member 6 due to shock is practically avoided.

The cross brace member 6 serves as an upper fifth member and is apertured centrally to receive the king bolt 7 which also passes through a central aperture in the lower fifth plate or member 8 positioned immediately beneath the brace 6. After passing through the member 8 the bolt 7 passes through a suitable aperture in the front wheels carrying yoke 9 and then through the aperture provided in the upper flat portion 10 of the draft bar which is bent as at 11 to straddle the yoke member 9. The yoke member 9 is of inverted U-shape and the said yoke, the plate 8 and the draft bar portion 10 are preferably welded together at their adjoining portions. While it is preferred that all three parts be welded together, the plate 8 and yoke 9 alone may be welded if desired.

The upper flat portion 10 of the draft bar extends a short distance rearwardly beyond the plate 8 where it is turned downwardly and forwardly as at 12 and is then bent upon itself to form vertical engaging portions 13 terminating at their lower ends in a receiving eye 14 which surrounds the front wheel axle 15 carried in the depending ends of the U-shaped yoke 9, see Figures 1, 2 and 3.

From the advance side the bar from which the draft bar is formed continues upwardly-forwardly as at 16 where it is bent horizontally upon itself to form lower and upper horizontal portions 17 and 18 which terminate at their advance ends in an eye 19 for receiving the bolt 20 which secures the wagon handle 21 to position. The eyes 14 and 19 may be braced by lateral angle braces 22 if desired.

The upper horizontal portion 18 of the draft bar extends a distance rearwardly beyond the portion 17 and the advance part of the bar portion 10 is bent upwardly over and welded thereto as at 23, see Figures 1 and 4. From the weld point the bar portion 10 is extended forward an additional distance and is bent up in spaced relation with the portion 18 and to a distance for overlying the flange of the curved frame portion 4 as indicated at 24 and clearly illustrated in Figure 1 of the drawings.

It will be observed that the draft bar is formed of a single piece of strap metal bent to the shape clearly illustrated in Figures 1 and 4. By reason of the shape and manner of mounting the draft bar, all thrusts that would ordinarily be directed to the king bolt 7 with a tendency to bend the same, are distributed to the frame portion 4 and thus a much more rugged and durable wagon than is commonly manufactured is made possible. Also, by reason of the one-piece construction of the draft bar such a wagon is provided at a minimum construction cost.

The front axle 15 may be threaded at its ends and secured to position by securing nuts 25. This is merely one means of securing the axle and it is to be understood that other means for securing the axle against longitudinal movement may be provided such as cotter pins and the like.

From the foregoing description, taken in connection with the accompanying drawings, it is thought that the novel details of construction, the manner of use and advantages of my invention will be readily apparent to those skilled in the art to which it relates.

What I claim is:

1. In a wagon fifth wheel assembly, in combination with the wagon frame including a curved front portion, an upper fifth wheel member, a lower fifth wheel member, an axle and wheel carrying yoke, a king bolt passing through the upper and lower fifth wheel members, and a draft member secured to the lower fifth wheel member and formed of a single length of flat bar bent to shape for providing means to engage the wheel axle and other means to engage the curved portion of the frame and distribute thereto shocks that would otherwise tend to bend the king bolt.

2. In a wagon fifth wheel assembly, in combination with the wagon frame including a curved front portion, an upper fifth wheel member, a lower fifth wheel member, an axle and wheel carrying yoke, a king bolt passing through the upper and lower fifth wheel members, a draft member secured to the lower fifth wheel member and formed of a single length of flat bar bent to shape for providing means to engage the wheel axle and other means to engage the curved portion of the frame and distribute thereto shocks that would otherwise tend to bend the king bolt, said draft bar also having a portion bent to straddle the yoke.

3. In a wagon fifth wheel assembly, in combination with the wagon frame including a curved front portion, an upper V-shaped fifth wheel member extending transversely of the frame and having its ends laterally and rearwardly extended from a central point and secured to the said frame, a lower fifth wheel member, an axle and wheel carrying yoke, a king bolt passing through the upper and lower fifth wheel members, and a draft member secured to the lower fifth wheel member and formed of a single length of flat bar bent to shape for providing means to engage the wheel axle and other means to engage the curved portion of the frame and distribute thereto shocks that would otherwise tend to bend the king bolt.

4. In a wagon fifth wheel assembly, in combination with the wagon frame including a curved front portion, an upper fifth wheel member, a lower fifth wheel member, an axle and wheel carrying yoke, a king bolt passing through the upper and lower fifth wheel members, and a triangular draft member secured to the lower fifth wheel member and bent from a flat bar to include an axle surrounding eye, a wagon handle bolt receiving eye and means to engage the curved portion of the frame and distribute thereto shocks that would otherwise tend to bend the king bolt.

5. In a wagon, a frame consisting of a pair of longitudinal side bars united at the front by a curved section, rear supporting wheels and a standard therefor on which the frame is mounted, front wheels and axle and means including a fifth wheel with a king bolt for mounting said frame on the front wheels and axle, and a means distinct from the fifth wheel and movable with the axle on the axis of the king bolt as a center to apply stresses which tend to bend the king bolt directly to said curved section of the frame, thereby relieving the king bolt, said last named means comprising a flat bar bent to form a horizontal portion secured to the fifth wheel member, a downwardly-forwardly bent portion, an axle surrounding eye, an upward-forwardly bent portion, a horizontally-rearwardly bent portion underlying the curved frame section, and a portion bent up over the said curved frame section and adapted to distribute to the said curved frame section shocks that would otherwise tend to bend the king bolt, the said horizontal portion and the said horizontally-rearwardly bent portion being secured together.

6. In a wagon fifth wheel assembly, in combination with the wagon frame, a king bolt carrying transverse brace apertured to receive the king bolt and secured at its ends to the wagon frame, said brace being extended rearwardly and laterally from the center at each side of the king bolt for the purpose described.

JOSEPH T. NORMAN.